3,466,364
METHOD OF TREATING ALOPECIA AND NOVEL COMPOSITIONS THEREFOR
Hidehiko Takahashi, Musashino-shi, Shinichiro Kaga, Tokyo, and Sadao Hirota, Chigasaki-shi, Japan, assignors to Daiichi Seiyaku Company Limited, Chuo-ku, Tokyo, Japan, a corporation of Japan
No Drawing. Filed Sept. 10, 1965, Ser. No. 486,520
Claims priority, application Japan, Nov. 30, 1964, 39/67,329
Int. Cl. A61k 7/06
U.S. Cl. 424—70        9 Claims

ABSTRACT OF THE DISCLOSURE

Alopecia is treated by the topical application of (3-carbomethoxypropyl) trimethyl ammonium chloride and a diluent.

---

The present invention release to a novel cosmetic material for hair nourishment. More particularly, the invention concerns a novel cosmetic material containing (3-carbomethoxypropyl) trimethyl ammonium chloride of the formula:

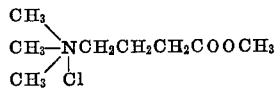

as an effective component.

This compound acts to prevent decoloration and depilation of the human hair, eyebrow and downy hairs as well as promote hair-growing.

The effective component, (3-carbomethoxypropyl) trimethyl ammonium chloride, can be produced by a process which comprises reacting methyl γ-chlorobutyrate with trimethylamine in an organic solvent selected from the group consisting of methanol, acetone and methyl ethyl ketone, copending U.S. application Ser. No. 229,483, now abandoned. The compound occurs as white crystalline powder of M.P. 112–115.5° C. which is easily soluble in water, soluble in ethanol and hardly soluble in benzene.

The cosmetic materials of the present invention show extremely remarkable hairiness effect when used for malignant type of alopecia, alopecia areata, alopecia pityrodes, multiple alopecia areata and alopecia praematura.

The effective component, (3-carbomethoxypropyl) trimethyl ammonium chloride, has an intense vasodilator action in experiments on cats or rabbits. The present inventors have now found that cosmetic compositions containing the compound have, also on the human body, extremely excellent hairgrowing action and actions to give gloss and nutrition to hair, eyebrow and downy hairs as well as to prevent decoloration and depilation thereof. It is considered that these actions are based on the following actions which are possessed by (3-carbomethoxypropyl) trimethyl ammonium chloride.

(1) Promoting the blood circulation of the follicle to sufficiently supply the source of energy required for hair-growing and growth of hair.

(2) Assisting multiplication of the blood vessel of the follicle in the growth period of hair and prolonging the growth period.

(3) Stimulating the follicle and prolonging the growth period.

In the present invention, (3-carbomethoxypropyl) trimethyl ammonium chloride is used in the dissolved, dispersed and mixed state in proper diluents. As the diluent, any one will do, only if it is harmless to the human body, especially to the skin, and simultaneously it has a property not damaging the effective component, for example, liquids such as water, alcohols and hair oil, solid powder such as talc, bentonite and calcium carbonate, as well as ointment, pomade, cosmetic water, lotion and air sol etc. are used.

Consequently, the cosmetic materials used in present invention are prepared by mixing, dissolving and dispersing (3-carbomethoxypropy)trimethyl ammonium chloride in the above-mentioned diluents. In this case, other nutrients, for example, vitamines, amino acids and hormones can be added.

Types of the cosmetic materials of the present invention can be properly selected according to the positions where they are applied and purposes of their uses, for example, they are used in the types of lotion, cold cream, vanishing cream, pomade, hair oil, aerosol and shampoo, etc.

(3-carbomethoxypropyl)trimethyl ammonium chloride is extremely soluble in water and lower alcohols and, in aqueous solution, it is most stable at vicinity of pH 3–5. Consequently, in cosmetic materials for which water is not used, it is favourable to dissolve the compound in ethyl alcohol with successive mixing and dispersing in an oily basal agent. For the preparation of lotions and liniments, ethyl alcohol is used as a solvent, 35–45% for the former and 50–70% for the latter, and glycerine and propylene glycol, etc. are simultaneously used as the skin softening wetting agents. As to cold cream and vanishing cream, it is possible to dissolve the compound in a small amount of water beforehand to knead it in ready-made cold cream or vanishing cream, but more favorable to dissolve the compound in water together with other water soluble components and pour it into an oil solution containing an emulsifying agent for the emulsification. It must be avoided to use alkali hydroxides and borax, etc. used in general because they render (3-carbomethoxypropyl)trimethyl ammonium chloride unstable. As the emulsifying agents, non-ionic surface active agents, are used, that is, those having HLB of 5–10 and soluble in oil for cold cream and those HLB 12–19 for vanishing cream respectively. As oils, higher alcohols, Vaseline, ceresin, waxes, cacao butter, castor oil, almond oil, olive oil and lanolin, etc. can be used.

Since (3-carboxymethylpropyl)trimethyl ammonium chloride is most soluble in castor oil among the oily basal agents, it is most favorable to use castor oil as a material for pomade and hair oil. Aerosol is prepared by dissolving (3-carbomethoxypropyl)trimethyl ammonium chloride in 50% ethyl alcohol, subsequently by adding 5–10% of glycerine propylene glycol, etc. as a skin softening wetting agent as well as by pressure filling in a sprayer together with, for example, commercial Freon 11, 12 (trade name designated by E. I. DuPont Co.) or mixtures of these materials as the spraying agents. For shampoo, it is favorable, in view of the stability of (3-carbomethoxy propyl) trimethyl ammonium cholride to add non-ionic surface active agents, for example, polysorbate 80, polyoxyethylene nonyl phenol (HLB 10–19) or alkylolamide and further several percents of lanolin as a wet retaining agent.

The cosmetic materials of the present invention prepared by dissolving (3-carbomethoxypropyl)trimethyl ammonium chloride in the above-mentioned diluents with concentrations generally in a range of 0.1–10% followed by dispersing or mixing, exhibit, when applied on the part affected, various effects such as hair-growing, prevention of depilation, growth acceleration of hair as well as blackening of white hair.

As for the dosage of (3-carbomethoxypropyl)trimethyl ammonium chloride to be used, the purpose of hair nourishing and hair-growing actions are accomplished without any harmful by-effect even with concentration more than 10% mentioned above, but any excess concentration denies the anticipation for any effect proportional to the concentration used and it is proper to use it with concentrations around 0.1–10% from the economical standpoint.

Example 1

Lotion was prepared by dissolving 1 part of (3-carbomethoxypropyl)trimethyl ammonium chloride and 5 parts of propylene glycol in 87 parts of 50% ethanol, to which coloring agent or perfume can be added in case of need.

Example 2

Liniment was prepared by dissolving 5 parts of (3-carbomethoxypropyl)trimethyl ammonium chloride and 10 parts of propylene glycol in 85 parts of 80% ethanol, to which perfume can be added if necessary.

Example 3

Cold cream was prepared by mixing 40 parts of white Vaseline, 18 parts of cetanol, 0.1 part of butyl paraben, 0.5 part of polyoxyethylene lauryl alcohol (HLB 9), and 5 parts of sesquioleic acid sorbitan and to this mixture adding, while heating at 75° C., a solution prepared by dissolving 1 part of (3-carbomethoxypropyl)trimethyl ammonium chloride and 0.1 part of ethyl paraben in 33 parts of purified water at 80° C., after cooling to 60° C. follower by subsequent addition of 2 parts of perfume as well as by agitation continued until it was solidified.

Example 4

25 parts of stearyl alcohol, 20 parts of white Vaseline, 5 parts of polyoxyethylene stearate (HLB 17) and 3 parts of squalene were mixed and dissolved by heating at 75° C. To this mixture there was gradually added, with agitation, a solution prepared by dissolving 1 part of (3-carbomethoxypropyl)trimethyl ammonium chloride, 12 parts of propylene glycol, 0.025 part of methyl paraben and 0.015 part of propyl paraben in 32 parts of purified water at 75° C. and uniformly emulsified, to which 2 parts of perfume were added after cooling to 60° C. and solidified with continuous agitation. Thus vanishing cream was prepared.

Example 5

Pomade was prepared by dissolving 1 part of (3-carbomethoxypropyl)trimethyl ammonium chloride and 0.1 part of butyl paraben in 10 parts of ethanol, mixing therein 77 parts of castor oil followed by heating the mixture at 70° C., adding 10 parts of bleached Japan wax heated and melted, followed by mixing, further adding 2 parts of perfume after cooling to 60° C., followed by pressure filtration as well as by pouring the filtrate into a cooled vessel with subsequent rapid cooling.

Example 6

Hair oil was prepared by dissolving 1 part of (3-carbomethoxypropyl)trimethyl ammonium chloride in 8 parts of ethanol and mixing therein 88 parts of castor oil followed by addition and dissolution of 1 part of polyoxyethylene castor oil (HLB 9) and 2 parts of perfume.

Example 7

Aerosol was prepared by dissolving 1 part of (3-carbomethoxypropyl)trimethyl ammonium chloride, 8 parts of propylene glycol and 1 part of perfume in 50% ethanol followed by filling it in a pressure sprayer together with Freon 1250.

Example 8

Shampoo was prepared by dissolving 1 part of sesquioleic acid sorbitan and 1 part of lanolin in 20 parts of polysorbate 80 to which an aqueous solution consisting of 1 part of (3-carbomethoxypropyl)trimethyl ammonium chloride, 2 parts of CMC and 74 parts of purified water was added and dissolved uniformly.

What we claim is:

1. A method of treating humans for alopecia which comprises topically applying an effective amount of a composition containing about 0.1 to 10 weight percent (3-carbomethoxypropyl)trimethyl ammonium chloride and a pharmaceutical diluent.

2. A method according to claim 1 wherein said composition contains about 0.1 to about 10 weight percent (3-carbomethoxypropyl)trimethyl ammonium chloride.

3. A method according to claim 2 wherein said composition is a liquid.

4. A method according to claim 2 wherein said composition is a cream.

5. A method according to claim 2 wherein said composition is applied by spraying.

6. A method according to claim 3 wherein said composition is applied as a shampoo.

7. The method according to claim 3 wherein said composition is applied as a lotion.

8. A method of treating humans for alopecia which comprises topically applying an effective amount of (3-carbomethoxypropyl)trimethyl ammonium chloride.

9. The method of claim 5 whereby said composition is dispensed by an aerosol.

References Cited

FOREIGN PATENTS 590,727  7/1947  Great Britain.

ELBERT L. ROBERTS, Primary Examiner

U.S. Cl. X.R.

260—482; 424—311